March 17, 1970  F. PFISTER ET AL  3,500,964
DAMPING ARRANGEMENT FOR TRACKING DEVICE
Filed April 17, 1968  2 Sheets-Sheet 1
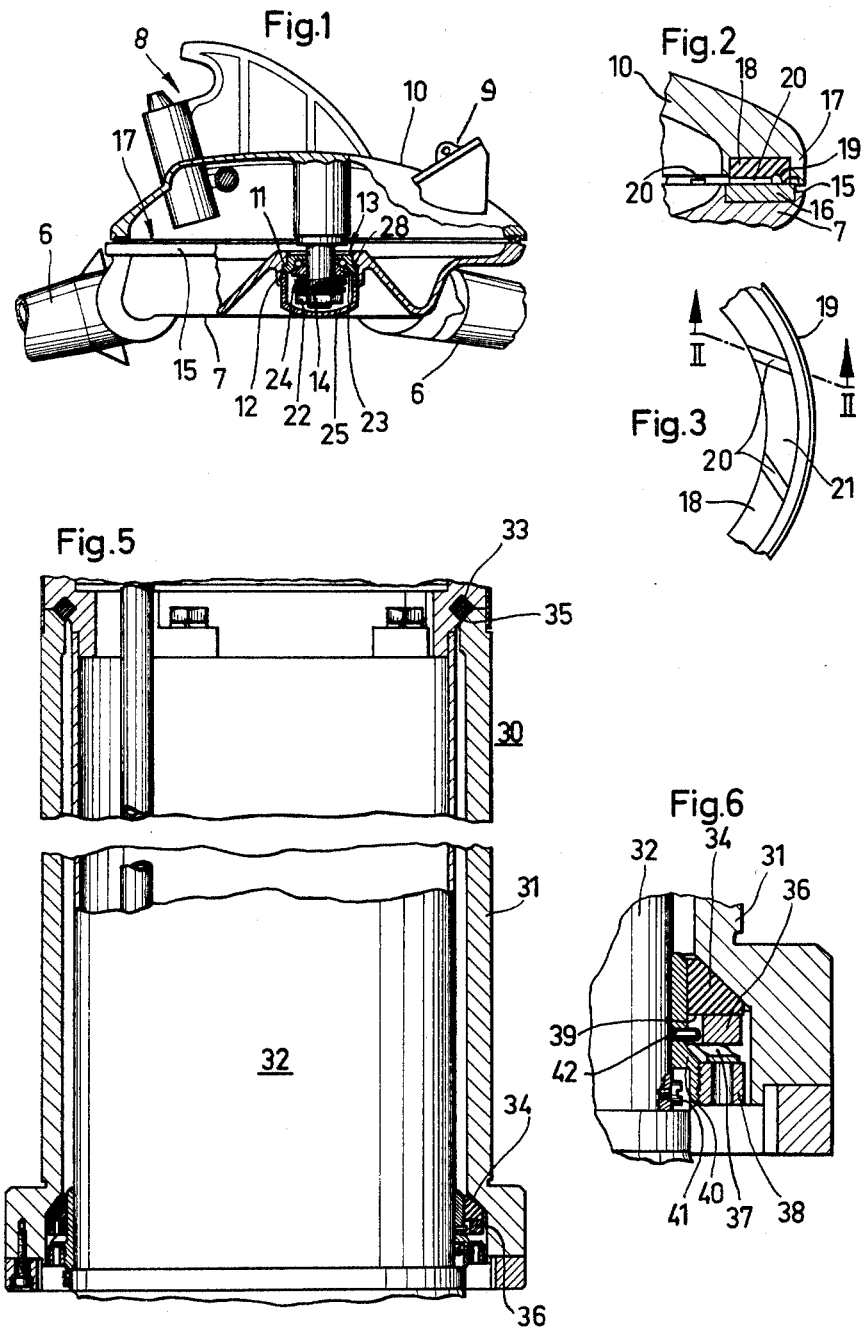
Inventors
Arnold Stangl
Franz Pfister
by
Attorneys United States Patent Office 3,500,964
Patented Mar. 17, 1970

3,500,964
DAMPING ARRANGEMENT FOR TRACKING DEVICE
Franz Pfister, Hochstadt, and Arnold Stangl, Ottobrunn, Germany, assignors to Bolkow Gesellschaft mit beschrankter Haftung, Ottobrunn, Germany
Filed Apr. 17, 1968, Ser. No. 722,122
Claims priority, application Germany, Apr. 25, 1967, B 92,216
Int. Cl. F16d *63/00*
U.S. Cl. 188—1                                    10 Claims

ABSTRACT OF THE DISCLOSURE

A damping arrangement, interposable between two relatively rotatable parts of a tracking device or the like, includes a ring consisting of a carbon fluoride resin fixed to rotate with one part and a polished steel ring fixed to rotate with the other part, the two rings being in engagement with each other. Adjustable spring means are provided to control the pressure between the two rings so that the maximum relative surface velocity of the two rings is always maintained at less than 30 m./min. Means are provided for limiting relative axial displacement of the two parts so as to limit the pressure on the carbon fluoride resin ring to a value sufficiently low to prevent flowing of the resin.

Background of the invention

Tracking devices, for tracking a moving object with a line of sight, such as, or example, in tracking moving persons with a movie camera or in sighting moving targets, must be movable at a substantially constant angular velocity independently of the magnitude of the driving energy applied. The excess driving energy therefore must be braked and, to this end, so-called brake regulators are known, which transform the excess driving energy into heat of friction formed between sliding surfaces.

Since these tracking problems involve, as a rule, angular movements of less than 360° so that it is constantly necessary to accelerate from standstill, and as the driving energy is produced manually, the design of such brake regulators is difficult. The so-called "stick-slip-effect," which is the alternating braking and sliding occurring at each starting of a tracking operation, prevents application of known brake regulators for this purpose. It has therefore been suggested to fixedly connect so-called damping disks with the rotary part of the tracking device, with these disks dipping into a housing filled, preferably, with oil.

Apart from the fact that such a construction is complicated and requires attention and maintenance from time to time, the great dependence of the attainable damping on the ambient temperature is a disturbing factor. The lack of chemical stability of the damping fluid also has an adverse effect. The result is different tracking velocities, which lead to undesired sighting errors.

It is also known to maintain the tracking velocity constant by means of fans or flywheels driven by the moving part of the tracking device. In addition to the cost of construction, it is particularly disadvantageous that the tracking device cannot be readily stopped, particularly in tracking devices using flywheels as the damping means, due to the energy stored in the flywheel. In addition, in sighting moving targets, the sighting device is run beyond the target direction when the target suddenly stops, unless additional braking devices are provided, and these increase the expense an additional amount. Here also, the above-mentioned "stick-slip-effect" manifests itself, and the unavoidable starting forces necessary to accelerate the flywheel have an adverse effect.

All the mentioned disadvantages of known damping devices have a particularly aggravating effect when an infrared position finder or sight is used to track a guided missile, or a target to be engaged by the missile, using a tracking device. Such devices not only should be rugged and reliable under any atmospheric conditions within a wide temperature range, but they should also be capable of easy storage for prolonged periods of time without any change in the parameters.

Summary of the invention

This invention relates to damping arrangements for tracking devices and, more particularly, to a novel, improved, more rugged and more efficient damping arrangement for tracking devices.

In accordance with the invention, a damping arrangement for tracking device is provided, which is particularly lightweight, space-saving and attendance-free, while being very reliable. In addition, it has unchanged damping properties over a wide temperature range from $-50°$ C. to $+70°$ C., for example, after a prolonged attendance-free storage period.

It has been found that carbon fluoride resins, such as tetrafluoroethylenes, have a conspicously low coefficient of friction, due to the extremely low secondary valence determining the attraction between the molecules. This coefficient of friction increases rapidly, from an initial value, with the sliding veloctiy, as comprehensive tests have shown. The coefficient of friction ceases to increase when the critical surface velocity reaches about 30 m./min., and the coefficient of friction remains relatively constant over an unusually wide temperature range, even after prolonged storage. The invention takes advantage of these factors by designing the damping arrangement as a journal bearing having at least one sliding surface consisting of a known carbon fluoride resin, the contact pressure of which with the corresponding sliding surface can be adjusted by a variable accumulator. The sliding surfaces are so selected, as to size, in dependence on the maximum occurring tracking velocity, that the maximum surface velocity of the sliding surfaces remains always less than 30 m./min.

By utilizing this relatively simple principle, a damping arrangement embodying the invention meets all practical requirements, is extremely rugged, requires little space and requires no attendance. Furthermore, over a wide temperature range, the damping arrangement of the invention has the same damping properties, as well as being completely insensitive to moisture.

The use of carbon fluoride resins as bearing materials is known, but heretofore, when there resins have been used as a bearing material, the "coefficient of friction as a function of the surface velocity" was always used in the horizontal portion of the characteristic curve, so that sliding velocities of more than 30 m./min. were maintained. In accordance with the present invention, however, carbon fluoride resins are used for the first time in the substantially linearly rising range of this characteristic curve, that is, with sliding velocities of less than 30 m./min. This is one of the most important distinguishing characteristics of the present invention with respect to the prior art.

In accordance with a preferred embodiment of the invention, the sliding surface of carbon fluoride resin is part of the ring having a substantially rectangular cross section, and which has a packing washer and slot-shaped openings extending tangentially to an imaginary inner circle. In this embodiment, the damping arrangement acts simultaneously as a packing device, and any foreign particles, which enter the slot-shaped ovenings, are thus removed from the sliding surface. This arrangement also makes it possible to effect pressure equalization between the space enclosed by the ring and the space surrounding the ring, so that formation of water of condensation inside the tracking device or between the sliding surfaces, is positively prevented.

In accordance with a further development of the invention, a journal bearing, acting as a damping device, has a sliding surface of carbon fluoride resin, and a corresponding sliding surface of polished steel, into which the particles of carbon fluoride resin have preferably diffused. By this expedient, the damping arrangement or device can be produced very accurately to such specifications, and has at least one sliding surface which is a plane surface of minimum roughness, and this has an extremely favorable effect on the damping properties.

In accordance with a further feature of the invention, the carbon fluoride resin ring is secured in a groove formed in a downwardly directed circular annular surface of a cover-like upper part of a stand. This stand has a bottom part which has support legs, and this bottom part has a corresponding upwardly directed circular annular surface formed with a groove receiving a steel ring having a polished surface. This bottom or lower part is also provided with a simple bearing surface forming a support for the central bearing pin of the upper part, and pressure between the resin ring and the steel ring is provided by means of cup springs arranged on the bearing pin.

In order to prevent flowing of the carbon fluoride resin sliding surface at suddenly appearing inadvertent overloads, there is preferably provided a part limiting the load on the journal bearing, and this part is preferably designed as a limiting bush which limits bearing movement in the load direction.

In accordance with another feature of the invention, the damping arrangement can be in the form of a well known, self-adjusting cone bearing having one part provided with a steel ring pressed by an axially displaceable spring and having a polished surface cooperating with a ring of carbon fluoride resin.

An object of the invention is to provide an improved damping device or arrangement for a tracking device.

Another object of the invention is to provide such a damping arrangement which is particularly light in weight, saving in space, and free from maintenance, but which is nevertheless reliable and has substantially stable damping properties over a wide temperature range even after a prolonged attendance-free storage period.

A further object of the invention is to provide such a damping arrangement including a carbon fluoride resin ring having a bearing surface in engagement with the polished surface of a steel ring, with the interengaged sliding surface being so selected as to size and selected tracking velocity that the maximum relative surface velocity of the sliding surfaces is always less than 30 m./min.

Yet another object of the invention is to provide such a damping arrangement which is extremely rugged, requires little space and requires substantially no maintenance.

A further object of the invention is to provide such a damping arrangement which is completely insensitive to moisture.

Yet another object of the invention is to provide such a damping arrangement acting simultaneously as a packing device with provision for self-clearing of foregin particles from between the sliding surfaces.

A further object of the invention is to provide such a damping arrangement in which particles of carbon fluoride resin preferably diffuse into a sliding surface of polished steel.

Another object of the invention is to provide such a damping arrangement including means preventing flowing of the carbon fluoride sliding surface under suddenly applied inadvertent overloads.

Brief description of the drawings

For an understanding of the principles of the invention, reference is made to the following description of typical embodiments thereof as illustrated in the accompanying drawings.

In the drawings:

FIG. 1 is a sectional elevation view of a tracking device for a missile firing apparatus, and embodying a damping device in accordance with the invention;

FIG. 2 is an enlarged partial sectional view of the damping device shown in FIG. 1, and taken along the line II—II of FIG. 3;

FIG. 3 is a partial plan view of a portion of the damping device, and corresponding to FIG. 2;

FIG. 5 is an elevation view, partly in section, illustrating a second embodiment of a tracking device incorporating the damping device of the inventions; and FIG. 6 is an enlarged partial sectional view illustrating a detail of the embodiment of the invention shown in FIG. 5.

Description of the preferred embodiments

Figure 4:
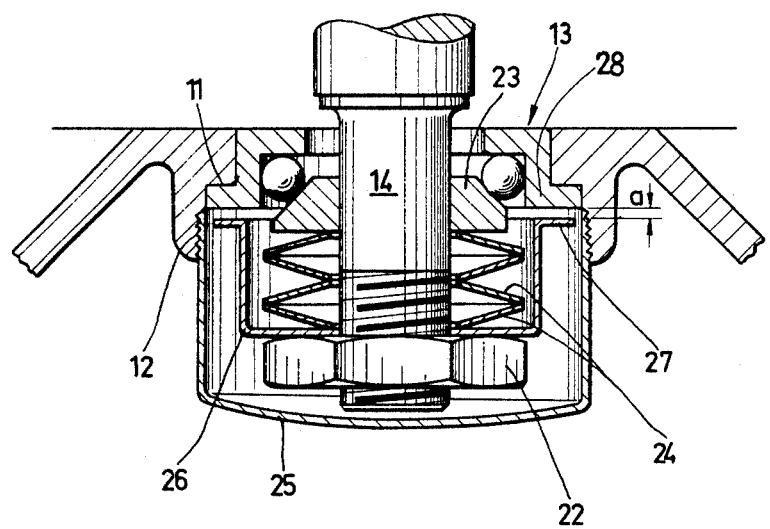
FIG. 4 is an enlarged partial sectional view illustrating a detail of the damping device shown in FIG. 1.

Solely by way of example, the damping device embodying the invention will be described with respect to a stand for receiving a launching apparatus for guided missiles, and without being limited to this particular application.

Such a stand consists essentially of a lower part 7 having swivel legs 6 and a cover-shaped upper part 10 having fastening means 8 and 9 for missile launching apparatus, which latter has not been illustrated as it forms no part of the invention. Lower part 7 has, at its center, a tubular extension or sleeve 12 formed with a recess or seat 11 for receiving a ball bearing assembly 13 on a central bearing pin 14 of upper part 10. However, even at this location, a journal bearing of tetrafluoroethylene could also be used. In concentric relation with sleeve 12, lower part 7, as best seen in FIG. 2, has an upwardly directed circular annular surface 15 formed with a substantially rectangular cross section annular groove receiving a steel ring 16 having a polished surface.

Upper part 10, which is mounted through ball bearing assembly 15 in lower part 7, has a circular annular surface 17 corresponding to circular annular surface 15 of lower part 7, and facing downwardly. This surface 17 has a substantially rectangular cross section annular groove or recess receiving a ring 18 of carbon fluoride resin such as, for example, tetrafluoroethylene. Ring 18, on its surface facing lower part 7, has a packing washer 19 as well as being formed with channels 20 extending tangentially to an imaginary inner circle, as best seen in FIG. 3. The circumference of ring 18 is substantially completely embraced by upper part 10 of the stand, as best seen in FIG. 2. Thus, only the sliding surface proper of ring 18 projects downwardly beyond the lower edge of upper part 10.

The lower end of bearing pin 14 of upper part 10 is threaded to receive a nut 22, and cup springs 24 embrace pin 14 between nut 22 and bearing race 23, the latter having a truncated cross section. The pressure of springs 24 can be varied by means of nut 22 threaded on pin 14. The described arrangement is protected against fouling by a hood or cap 25 threaded into tubular extension or sleeve 12, as best seen in FIG. 4.

Again referring to FIG. 4, a limiting bush 26 is provided with one end face bearing against nut 22. The other end face is designed as a flange 27, and is arranged at a distance *a* from a ring 28 disposed in sleeve or extension 12 and forming the upper race of ball bearing assembly 13. By this means, tilting or other displacement of upper part 10 relative to lower part 7, is limited to the distance *a*, and thus overloading, leading to flowing of the material of ring 18, is prevented.

As can be seen more particularly in FIG. 2, the damping device proper comprises the sliding surfaces of rings 16 and 18 which are pressed against each other and whose contact pressure is variable by turning nut 22. The dimensions of these rings, and thus of the circularly annular surfaces 15 and 17 carrying these rings, as well as the dimensions of springs 24, are so selected, as a function of the maximum tracking velocity which is the speed of rotation of upper part 10 performing the tracking movement, that the maximum relative surface velocity between carbon fluoride resin ring 18 and the polished surface of steel ring 16 is always less than 30 m./min.

In the embodiment of the invention shown in FIGS. 5 and 6, the damping device is illustrated in connection with a telescope 30. In this embodiment, an inner cylindrical part 32, to be moved relative to an outer cylindrical sleeve 31, is supported by means of carbon fluoride resin rings 33 and 34. The upper ring 33 illustrated in FIG. 5 bears on a sliding surface 35 of sleeve 31 and forms a regular cone bearing. Lower ring 34 of FIG. 5, however, forms, in cooperation with the steel ring 36, the damping device proper. To this end, and as best seen in the enlarged sectional view of FIG. 6, the surface of ring 36 facing ring 34 is polished, and this ring is pressed by means of a corrugated spring 37 against sliding surface 39 of ring 34. The tension of corrugated spring 37 is variable by means of a ring 38 which is threaded on a sleeve 40 secured on inner cylinder 32 and held against turning relative to sleeve cylinder 32 by means of screws 41. A pin 42 in sleeve 40 projects into steel ring 36 to restrain ring 36 against turning. Ring 34 preferably has its circumference slit, so that it forms, in cooperation with steel ring 36, a known self-adjusting cone bearing.

As will be apparent from the foregoing description, the damping device is designed as a journal bearing in both embodiments, and the contact pressure between the sliding surfaces is variable by an adjustable accumulator or spring. At least one of the sliding surfaces consists of carbon fluoride resin, such as tetrafluoroethylene. The other sliding surface comprises polished steel into which diffuse carbon fluoride resin molecules, so that this other sliding surface is formed as a so-called "teflonized" surface. This has a favorable effect on the damping properties, and particularly insures that the above-mentioned "stick-slip-effect" does not appear during starting of a tracking movement. Naturally, other carrier materials can be used for the carbon fluoride resin. A prerequisite is only that the sliding surfaces of the damping device are pressed against each other in all operating positions, and that the arrangement is such that the maximum relative surface velocity of the sliding surfaces carrying carbon fluoride resin, as a function of the maximum occurring tracking velocity, is always less than 30 m./min.

While specific embodiments of the invention have been shown and described in detail to illustrate the application of the principles of the invention, it will be understood that the invention may be embodied otherwise without departing from such principles.

What is claimed is:
1. A damping device, particularly for use with means for tracking a moving object by line of sight, said damping device comprising, in combination, journal bearing means, including a first bearing member having a first sliding surface consisting of a carbon fluoride resin, and a second bearing member having a second sliding surface engaging said first sliding surface; and adjustable accumulator means operatively associated with said bearing members and operable to adjust the contact pressure between said sliding surfaces; the dimensions of said sliding surfaces, and the adjustment of said accumulator means, being selected, in accordance with a predetermined tracking velocity, to maintain the maximum relative surface velocity between said sliding surfaces at less than 30 m./min.

2. A damping device, as claimed in claim 1, in which said carbon fluoride resin is tetrafluoroethylene.

3. A damping device, as claimed in claim 1, in which said first bearing member is a ring having a substantially rectangular cross section, and said first sliding surface constituting a diametrically extending end surface of said ring.

4. A damping device, as claimed in claim 3, in which said journal bearing means includes a packing washer operatively associated with said ring.

5. A damping device, as claimed in claim 4, in which said first sliding surface is formed with a plurality of substantially rectilinear slots thereacross extending tangentially to an imaginary inner circle.

6. A damping device, as claimed in claim 1, in which said second sliding surface is a polished steel surface.

7. A damping device, as claimed in claim 6, in which said polished steel surface contains diffused particles of carbon fluoride resin.

8. A damping device, as claimed in claim 3, in which said journal bearing means is included in a stand comprising a lower part having supporting legs and an upper cover-shaped part rotatably mounted on said lower part; said uper part having a downwardly facing circularly annular surface formed with a substantially rectangular cross section annular groove extending therealong; said carbon fluoride resin ring being seated in said groove with its sliding surface facing downwardly; said lower part being fromed with an upwardly facing circularly annular surface aligned with said downwardly facing circularly annular surface and formed with a substantially rectangular cross section annular groove extending therealong; said second bearing member comprising a substantially rectangular cross section steel ring seated in said last-mentioned groove and having a polished upper surface engaging the surface of said carbon fluoride resin ring; said lower part having a central bearing surface and said upper part having a central bearing pin engaged in said central bearing surface; said adjustable accumulator means comprising annular cup springs on said central bearing pin and means engaged with said pin and said springs and operable to adjust the effective pressure of said springs to adjust the contact pressure between said sliding surfaces.

9. A damping device, as claimed in claim 1, in which said journal bearing means includes means operatively associted with said first and second bearing members and limiting relative axial movement thereof to limit the pressure effective on said sliding surfaces.

10. A damping device, as claimed in claim 1, in which said journal bearing means is a self-adjusting cone bearing; said second bearing member comprising a steel ring, and said second sliding surface being a polished steel surface; said adjustable accumulator means comprising an axially adjustable corrugated annular spring.

References Cited

UNITED STATES PATENTS

| 2,896,937 | 7/1959 | Miller | 188—1 X |
| 3,116,813 | 1/1964 | Ziegler | 188—1 |
| 3,237,741 | 3/1966 | Potter et al. | 188—1 X |

DUANE A. REGER, Primary Examiner

U.S. Cl. X.R.

73—430; 248—358